(12) United States Patent
Gubbi Lakshminarasimha et al.

(10) Patent No.: US 12,304,090 B2
(45) Date of Patent: May 20, 2025

(54) SYSTEMS AND METHODS FOR ANOMALY DETECTION AND CORRECTION

(71) Applicant: Tata Consultancy Services Limited, Mumbai (IN)

(72) Inventors: Jayavardhana Rama Gubbi Lakshminarasimha, Bangalore (IN); Vartika Sengar, Bangalore (IN); Vighnesh Vatsal, Bangalore (IN); Balamuralidhar Purushothaman, Bangalore (IN); Arpan Pal, Kolkata (IN); Nijil George, Kolkata (IN); Aditya Kapoor, Kolkata (IN)

(73) Assignee: Tata Consultancy Services Limited, Mumbai (IN)

( * ) Notice: Subject to any disclaimer, the term of this patent is extended or adjusted under 35 U.S.C. 154(b) by 272 days.

(21) Appl. No.: 18/198,661

(22) Filed: May 17, 2023

(65) Prior Publication Data

US 2023/0373096 A1 Nov. 23, 2023

(30) Foreign Application Priority Data

May 20, 2022 (IN) .............................. 202221029254

(51) Int. Cl.
*B25J 9/16* (2006.01)
(52) U.S. Cl.
CPC .............. *B25J 9/1697* (2013.01); *B25J 9/161* (2013.01); *B25J 9/163* (2013.01); *B25J 9/1653* (2013.01)
(58) Field of Classification Search
None
See application file for complete search history.

(56) References Cited

U.S. PATENT DOCUMENTS

| | | | |
|---|---|---|---|
| 10,467,587 B2 | 11/2019 | Bogolea et al. | |
| 11,772,270 B2 * | 10/2023 | Deyle | F41H 7/005 700/258 |
| 2020/0061839 A1 | 2/2020 | Deyle et al. | |

OTHER PUBLICATIONS

Mueller, Object Shape Categorization in RGBD Images using Hierarchical Graph Constellation Models based on Unsupervisedly Learned Shape Parts described by a Set of Shape Specificity Levels (Year: 2014).*

(Continued)

*Primary Examiner* — Wade Miles
*Assistant Examiner* — Arslan Azhar
(74) *Attorney, Agent, or Firm* — Finnegan, Henderson, Farabow, Garrett & Dunner, LLP (57) ABSTRACT

Conventional task planners assume that the task-plans provided are executable, hence these are not task-aware. Present disclosure alleviates the downward refinability assumption, that is, planning can be decomposed separate symbolic and continuous planning steps by introducing bi-level planning, a plan which is a series of actions that the robot needs to take to achieve the goal task is curated. Firstly, abstract symbolic actions are converted to continuous vectors and used therein to enable interaction with an environment. Images of objects placed in the environment are captured and concepts are learnt from the captured images and attributes of objects are detected. A hierarchical scene graph is generated from the concepts and attributes wherein the graph includes interpretable sub-symbolic representations and from these interpretable symbolic representations are obtained for identifying goal task. Anomalies are detected from the scene graph and robotic actions are generated to correct the detected anomalies.

15 Claims, 4 Drawing Sheets

(56) References Cited

OTHER PUBLICATIONS

Milella et al., "Towards Intelligent Retail: Automated On-Shelf Availability Estimation using a Depth Camera," IEEE Access, 4 (2016).
Paolanti et al., "Mobile Robot for Retail Surveying and Inventory Using Visual and Textual Analysis of mononuclear pictures based on Deep Learning," (2017).
Winkler et al., "Knowledge-Enabled Robotic Agents for Shelf Replenishment in Cluttered Retail Environments," (2016).

* cited by examiner

SYSTEMS AND METHODS FOR ANOMALY DETECTION AND CORRECTION

PRIORITY CLAIM

This U.S. patent application claims priority under 35 U.S.C. § 119 to: Indian Patent Application No. 202221029254, filed on May 20, 2022. The entire contents of the aforementioned application are incorporated herein by reference.

TECHNICAL FIELD

The disclosure herein generally relates to inventory management systems, and, more particularly, to systems and methods for anomaly detection and correction.

BACKGROUND

In a typical retail store or a warehouse scenario, inventory is arranged according to planograms—visual schematics for object placement on shelves. The role of human associates is to replenish any gaps in the inventory based on the planogram, check for misplaced items, and perform object rearrangement and clean-ups. These actions can be collectively termed as "inventory anomaly detection and correction" in a retail or warehouse scenario.

Recently, many companies have launched mobile robots that scan shelves, digitize inventory, and alert human associates of any anomalies. While these robots can track inventory, they still rely on the intervention of human associates to perform even elementary manipulation tasks for correcting anomalies. Further, the perception of anomaly is performed using niche algorithms that will not help in automation of inventory anomaly detection and correction.

An autonomous system for anomaly correction would involve a mobile robot with visual or non-visual sensing, along with manipulation capabilities using a robotic arm and gripper. Such a solution would offer more value to a retail establishment by automating labor-intensive human tasks while remaining within comparable levels of capital expenditure to a detection-only robot. The first step in the solution pipeline is the perception of the anomalies. Computer vision-based approaches have been successfully applied to the retail shelf or a warehouse shelf inspection context for object and anomaly detection. Their performance can be attributed to advancements in deep neural networks for visual perception. The systems for automated shelf monitoring define this problem as simultaneous detection and recognition of objects placed on a store shelf or warehouse shelf using different types of feature descriptors such as key points, gradients, patterns, colors, and feature embedding obtained from deep learning methods. These systems typically use a two-stage process to detect anomalies by checking whether the observed image is in agreement with the pre-defined planogram or not. In the first stage, the products are detected using methods such as window-based HOG (Histogram of Oriented Gradients), BOW (Bag of Words), template matching based on morphological gradients and recurrent pattern recognition. In the second stage, matching is done between the observations of the first stage and the actual layout in the planogram through techniques such as sub-graph isomorphism and spectral graph matching.

However, the dependence on planograms limits the usage of these systems in retail settings due to periodic layout updates and constant introduction of anomalies by human agents. These approaches also face challenges due to class imbalances, large label spaces, extreme classification, low inter-class variance, and adaptability towards new classes.

The next step in the solution pipeline is task and motion planning (TAMP) for the mobile manipulator robot. Formulating a task plan relies on the availability of a transition system. The challenge for planning involves extracting the key components of transition systems through visual perception in a format that can be interpreted by a planner. The above-mentioned vision-based methods give distributed representation where features are continuous-valued vectors that cannot be directly utilized by the planner, which acts on local representation to specify goals and predicates. Once a plan is formulated, it is executed on the robot by controlling the torques of the robot's motors. This happens for navigation by controlling the motors at the robot's mobile base while ensuring collision-free movements in the environment. For manipulating objects, the robotic arm and gripper rely on grasp planning and closed loop visual feedback. The overall approach involves a vision-based planner, such as a Grasp Quality Convolutional Neural Networks, which is refined using a Reinforcement Learning model that makes the grasp plan robust to various object shapes and geometries, and finally confirming the execution of the grasp by visual feedback and/or haptic sensing. This strategy is adaptable to various gripper designs, including two-fingered parallel jaw grippers, vacuum suction grippers, and compliant grippers with fingers fabricated using soft materials.

SUMMARY

Embodiments of the present disclosure present technological improvements as solutions to one or more of the above-mentioned technical problems recognized by the inventors in conventional systems.

In one aspect, there is provided a processor implemented method for anomaly detection and correction. The method includes obtaining, via one or more hardware processors, an input stereo video captured by a video capturing device, wherein the input stereo video is associated with an environment; identifying, via the one or more hardware processors, one or more red, green and blue (RGB) stereo image frames from the input stereo video; detecting, via the one or more hardware processors, one or more representative image frames from the one or more RGB stereo image frames and identifying one or more bounding boxes associated with at least one of one or more groups and one or more objects comprised in the one or more groups present in the one or more representative image frames; learning, via the one or more hardware processors, one or more concepts associated with each of the one or more objects and each of the one or more groups comprised in the one or more representative image frames using a concept learner; detecting, via the one or more hardware processors, one or more attributes from each of the one or more objects and each of the one or more groups comprised in the one or more representative image frames; generating, via the one or more hardware processors, a hierarchical scene graph from the one or more concepts and the one or more attributes, wherein the generated hierarchical scene graph comprises one or more interpretable sub-symbolic representations; detecting, via the one or more hardware processors, one or more anomalies using at least one of the generated hierarchical scene graph and the one or more concepts; identifying, via the one or more hardware processors, a goal task comprising a sequence of actions based on (i) one or more constraints, and (ii) one or more interpretable symbolic representations obtained from the one or more interpretable sub-symbolic representations comprised in the generated hierarchical scene graph, wherein the one or more interpretable sub-symbolic representations of a current state of the environment are generated using a first neural network, and wherein the one or more interpretable sub-symbolic representations are mapped to one or more associated symbolic predicates using a second neural network; generating, via the one or more hardware processors, a set of robotic actions associated with the identified goal task using the first neural network and a pre-defined symbolic knowledge base, wherein the pre-defined symbolic knowledge base is periodically updated using the second neural network; and correcting, via the one or more hardware processors, the one or more detected anomalies based on a robot performing the generated set of robotic actions.

In an embodiment, the one or more concepts comprise at least one of color, shape, size, and spatial relation associated with the one or more objects.

In an embodiment, the goal task comprises a sequence of actions containing a list of objects to be manipulated with an initial state and a goal state and the list of objects to be manipulated for correcting the one or more anomalies is based on the generated hierarchical scene graph or the one or more concepts.

In an embodiment, a knowledge of altered environment is obtained based on the one or more interpretable sub-symbolic representations.

In an embodiment, the generated set of robotic actions comprises one or more commands for execution by a robot, and a status of the one or more commands is determined by a binary checking mechanism.

In an embodiment, the one or more commands are executed in an iterative manner based on the status.

In another aspect, there is provided a system for anomaly detection and correction. The system comprises a memory storing instructions; one or more communication interfaces; and one or more hardware processors coupled to the memory via the one or more communication interfaces. The one or more hardware processors are configured by the instructions to: obtain, an input stereo video captured by a video capturing device, wherein the input stereo video is associated with an environment; identify one or more red, green and blue (RGB) stereo image frames from the input stereo video; detect one or more representative image frames from the one or more RGB stereo image frames and identifying one or more bounding boxes associated with at least one of one or more groups and one or more objects comprised in the one or more groups present in the one or more representative image frames; learn one or more concepts associated with each of the one or more objects and each of the one or more groups comprised in the one or more representative image frames using a concept learner; detect one or more attributes from each of the one or more objects and each of the one or more groups comprised in the one or more representative image frames; generate a hierarchical scene graph from the one or more concepts and the one or more attributes, wherein the generated hierarchical scene graph comprises one or more interpretable sub-symbolic representations; detect one or more anomalies using at least one of the generated hierarchical scene graph and the one or more concepts; identify a goal task comprising a sequence of actions based on (i) one or more constraints, and (ii) one or more interpretable symbolic representations obtained from the one or more interpretable sub-symbolic representations comprised in the generated hierarchical scene graph, wherein the one or more interpretable sub-symbolic representations of a current state of the environment are generated using a first neural network, and wherein the one or more interpretable sub-symbolic representations are mapped to one or more associated symbolic predicates using a second neural network; generate a set of robotic actions associated with the identified goal task using the first neural network and a pre-defined symbolic knowledge base, wherein the pre-defined symbolic knowledge base is periodically updated using the second neural network; and correct the one or more detected anomalies based on a robot performing the generated set of robotic actions.

In an embodiment, the one or more concepts comprise at least one of color, shape, size, and spatial relation associated with the one or more objects.

In an embodiment, the goal task comprises a sequence of actions containing a list of objects to be manipulated with an initial state and a goal state and the list of objects to be manipulated for correcting the one or more anomalies is based on the generated hierarchical scene graph or the one or more concepts.

In an embodiment, a knowledge of altered environment is obtained based on the one or more interpretable sub-symbolic representations.

In an embodiment, the generated set of robotic actions comprises one or more commands for execution by a robot, and a status of the one or more commands is determined by a binary checking mechanism.

In an embodiment, the one or more commands are executed in an iterative manner based on the status.

In yet another aspect, there are provided one or more non-transitory machine-readable information storage mediums comprising one or more instructions which when executed by one or more hardware processors cause anomaly detection and correction by obtaining an input stereo video captured by a video capturing device, wherein the input stereo video is associated with an environment; identifying one or more red, green and blue (RGB) stereo image frames from the input stereo video; detecting one or more representative image frames from the one or more RGB stereo image frames and identifying one or more bounding boxes associated with at least one of one or more groups and one or more objects comprised in the one or more groups present in the one or more representative image frames; learning one or more concepts associated with each of the one or more objects and each of the one or more groups comprised in the one or more representative image frames using a concept learner; detecting one or more attributes from each of the one or more objects and each of the one or more groups comprised in the one or more representative image frames; generating a hierarchical scene graph from the one or more concepts and the one or more attributes, wherein the generated hierarchical scene graph comprises one or more interpretable sub-symbolic representations; detecting one or more anomalies using at least one of the generated hierarchical scene graph and the one or more concepts; identifying a goal task comprising a sequence of actions based on (i) one or more constraints, and (ii) one or more interpretable symbolic representations obtained from the one or more interpretable sub-symbolic representations comprised in the generated hierarchical scene graph, wherein the one or more interpretable sub-symbolic representations of a current state of the environment are generated using a first neural network, and wherein the one or more interpretable sub-symbolic representations are mapped to one or more associated symbolic predicates using a second neural network; generating a set of robotic actions associated with the identified goal task using the first neural network and a pre-defined symbolic knowledge base, wherein the pre-defined symbolic knowledge base is periodically updated using the second neural network; and correcting the one or more detected anomalies based on a robot performing the generated set of robotic actions.

In an embodiment, the one or more concepts comprise at least one of color, shape, size, and spatial relation associated with the one or more objects.

In an embodiment, the goal task comprises a sequence of actions containing a list of objects to be manipulated with an initial state and a goal state and the list of objects to be manipulated for correcting the one or more anomalies is based on the generated hierarchical scene graph or the one or more concepts.

In an embodiment, a knowledge of altered environment is obtained based on the one or more interpretable sub-symbolic representations.

In an embodiment, the generated set of robotic actions comprises one or more commands for execution by a robot, and a status of the one or more commands is determined by a binary checking mechanism.

In an embodiment, the one or more commands are executed in an iterative manner based on the status.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments.

As mentioned earlier, computer vision-based methods give distributed representations where features are continuous-valued vectors that cannot be directly utilized by the planning module which acts on local representation to specify goals and predicates. To bridge between the two paradigms described earlier, present disclosure provides systems and methods that learn sub-symbolic representations (e.g., concept representations). Generally, state-of-the-art Symbolic Artificial Intelligence (AI) methods include a predefined set of concepts with their values learned based on questions and answers. However, the choice of concepts, and how to handle previously unseen concepts or attributes, remains an open problem. Another challenge is that the concepts must be represented in a structured manner, and the knowledge should allow for reasoning at different levels of abstraction. Present disclosure provides systems and methods that use hierarchical scene graphs for this purpose. Scheduling and prioritization will be included in the High-Level Planning Module in case multiple anomalies are detected. The final step is to execute the task and motion plan for mobile manipulation to correct the detected anomaly in a closed-loop manner.

Referring now to the drawings, and more particularly to FIG. 1 through 4, where similar reference characters denote corresponding features consistently throughout the figures, there are shown preferred embodiments and these embodiments are described in the context of the following exemplary system and/or method.

Figure 1:
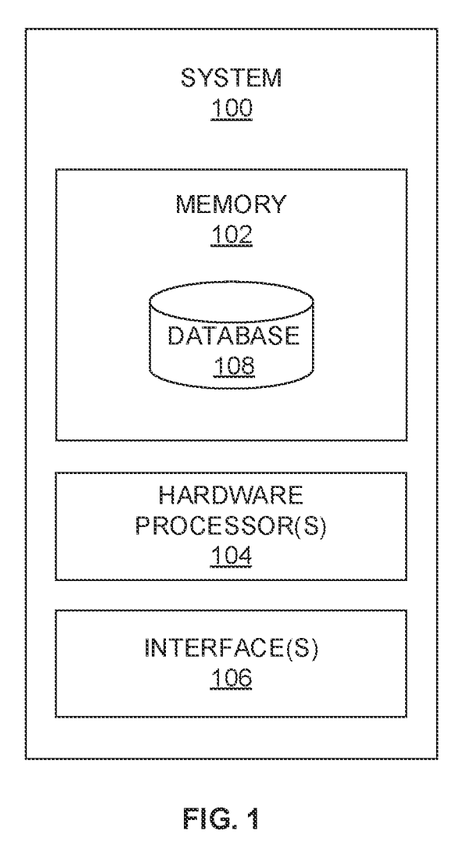
FIG. 1 depicts an exemplary system for anomaly detection and correction, in accordance with an embodiment of the present disclosure.

FIG. 1 depicts an exemplary system 100 for anomaly detection and correction, in accordance with an embodiment of the present disclosure. In an embodiment, the system 100 includes one or more hardware processors 104, communication interface device(s) or input/output (I/O) interface(s) 106 (also referred as interface(s)), and one or more data storage devices or memory 102 operatively coupled to the one or more hardware processors 104. The one or more processors 104 may be one or more software processing components and/or hardware processors. In an embodiment, the hardware processors can be implemented as one or more microprocessors, microcomputers, microcontrollers, digital signal processors, central processing units, state machines, logic circuitries, and/or any devices that manipulate signals based on operational instructions. Among other capabilities, the processor(s) is/are configured to fetch and execute computer-readable instructions stored in the memory. In an embodiment, the system 100 can be implemented in a variety of computing systems, such as laptop computers, notebooks, hand-held devices (e.g., smartphones, tablet phones, mobile communication devices, and the like), workstations, mainframe computers, servers, a network cloud, and the like.

The I/O interface device(s) 106 can include a variety of software and hardware interfaces, for example, a web interface, a graphical user interface, and the like and can facilitate multiple communications within a wide variety of networks N/W and protocol types, including wired networks, for example, LAN, cable, etc., and wireless networks, such as WLAN, cellular, or satellite. In an embodiment, the I/O interface device(s) can include one or more ports for connecting a number of devices to one another or to another server.

The memory 102 may include any computer-readable medium known in the art including, for example, volatile memory, such as static random-access memory (SRAM) and dynamic-random access memory (DRAM), and/or non-volatile memory, such as read only memory (ROM), erasable programmable ROM, flash memories, hard disks, optical disks, and magnetic tapes. In an embodiment, a database 108 is comprised in the memory 102, wherein the database 108 comprises information input stereo video data that corresponds to an environment comprising of objects and group of objects (either similar and/or identical objects) being placed in various positions. The database 108 further comprises one or more red, green and blue (RGB) stereo image frames obtained from the input stereo video data, one or more representative image frames, anomalies, anomalies correction related information and the like. The memory 102 further comprises (or may further comprise) information pertaining to input(s)/output(s) of each step performed by the systems and methods of the present disclosure. In other words, input(s) fed at each step and output(s) generated at each step are comprised in the memory 102 and can be utilized in further processing and analysis.

Figure 2:
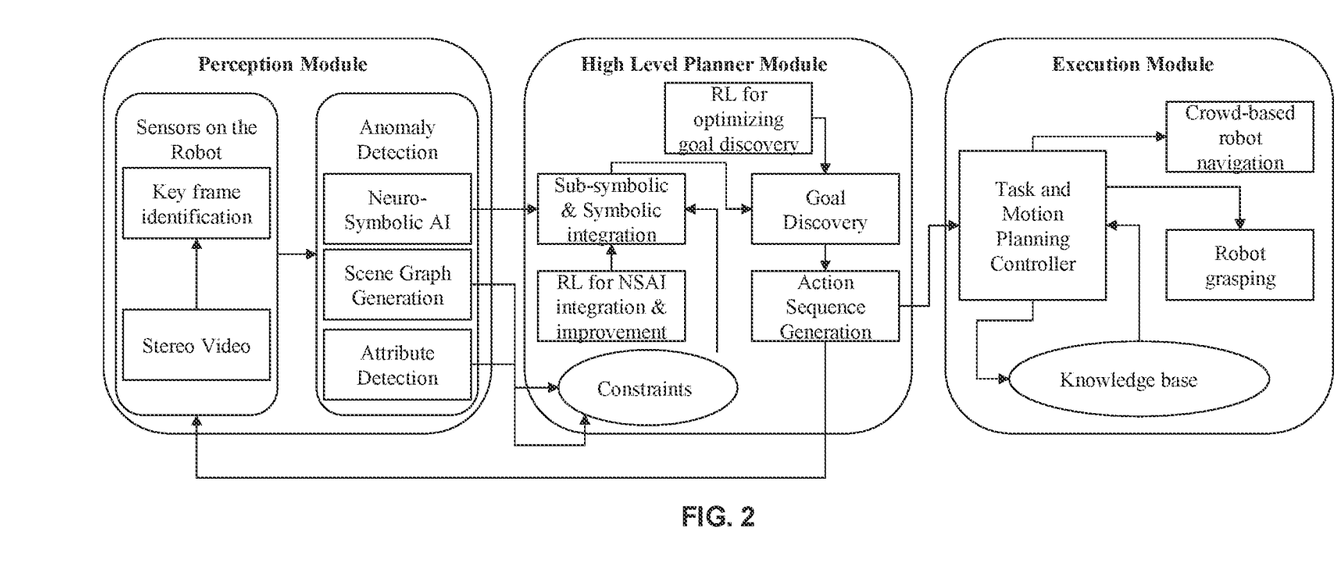
FIG. 2 depicts an exemplary high level block diagram of the system of FIG. 1 for anomaly detection and correction, in accordance with an embodiment of the present disclosure.

FIG. 2 depicts an exemplary high level block diagram of the system 100 for anomaly detection and correction, in accordance with an embodiment of the present disclosure. Functions of the components of the system 100 in FIG. 2 are explained with reference to the process steps depicted in FIG. 3.

Figure 3:
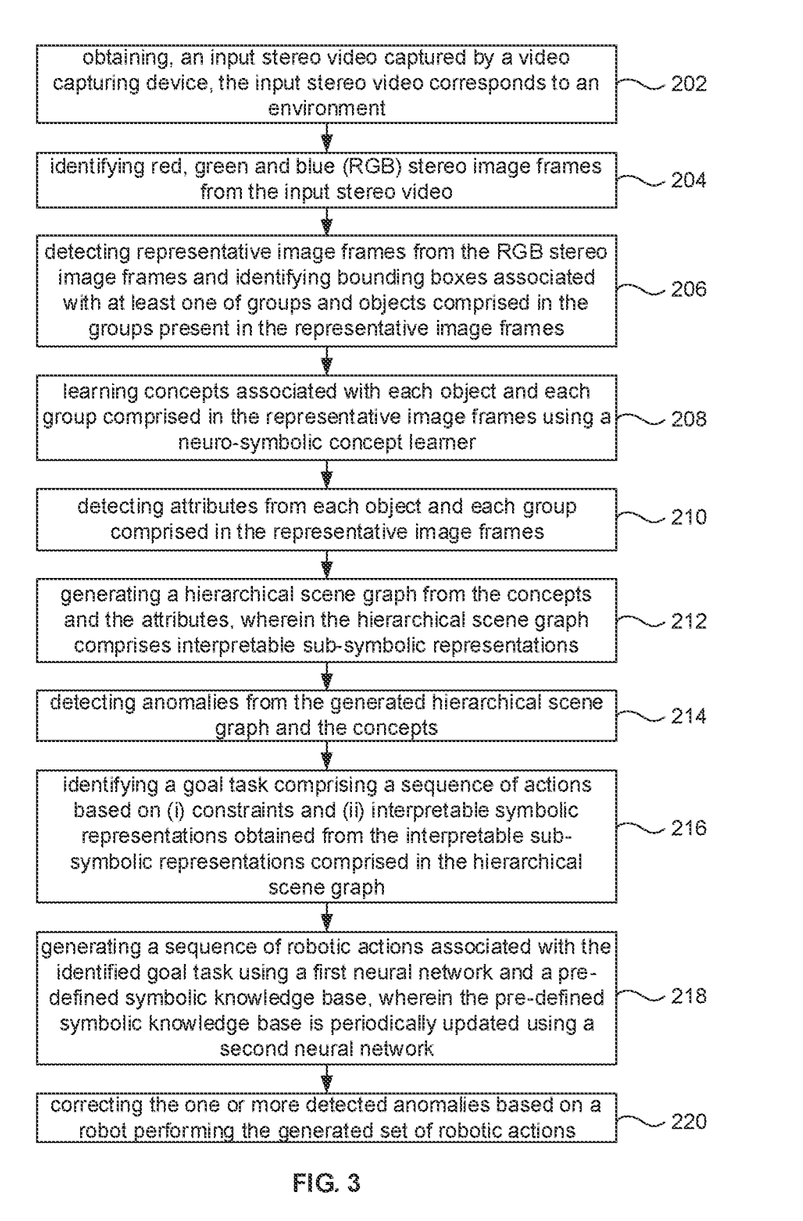
FIG. 3 depicts an exemplary flow chart illustrating a processor implemented method for anomaly detection and correction, using the systems of FIGS. 1-2, in accordance with an embodiment of the present disclosure.

FIG. 3 depicts an exemplary flow chart illustrating a processor implemented method for anomaly detection and correction, using the systems of FIGS. 1-2, in accordance with an embodiment of the present disclosure. In an embodiment, the system(s) 100 comprises one or more data storage devices or the memory 102 operatively coupled to the one or more hardware processors 104 and is configured to store instructions for execution of steps of the method by the one or more processors 104. The steps of the method of the present disclosure will now be explained with reference to components of the system 100 of FIG. 1, the block diagram of the system 100 depicted in FIG. 2, and the flow diagram as depicted in FIG. 3A-3B.

At step 202 of the method of the present disclosure, the one or more hardware processors 104 obtain, an input stereo video (also referred as input stereo video data and interchangeably used herein) captured by a video capturing device. The input stereo video is associated with an environment. In one embodiment, examples of environment may include, a warehouse, an inventory management unit, a retail store, a shop, and the like.

At step 204 of the method of the present disclosure, the one or more hardware processors 104 identify one or more red, green and blue (RGB) stereo image frames from the input stereo video. The steps 202 and 204 are better understood by way of following description: The video capturing device such as a camera may be mounted on to a robot or configured as a self-contained component within the robot. The robot traverses to a shelf that it has not visited before or previously. This is done by querying a knowledge base, for example, but is not limited to a map and the location of the unvisited shelf is accordingly fetched. Upon reaching the shelf or location of the shelf, the robot captures the images/videos of objects kept on one or more rows of the shelf using the camera mounted on the robot (or its mobile base), wherein the captured images/videos, the RGB stereo images are identified accordingly.

At step 206 of the method of the present disclosure, the one or more hardware processors 104 detect one or more representative image frames from the one or more RGB stereo image frames and identify one or more bounding boxes or exact shape of the objects (using semantic segmentation) associated with at least one of one or more groups and one or more objects comprised in the one or more groups present in the one or more representative image frames.

At step 208 of the method of the present disclosure, the one or more hardware processors 104 learn one or more concepts associated with each of the one or more objects and each of the one or more groups comprised in the one or more representative image frames using a concept learner such as neuro-symbolic concept learner. The one or more concepts comprise at least one of color, shape, size, and spatial relation associated with the one or more objects, or combinations thereof. These concepts (also referred as concept embeddings or concept representations and interchangeably used herein) of each object are also used to generate the state-abstractions that are used by a Task and Motion Planning module (wherein the Task and Motion Planning module is stored in the memory 102 and invoked for execution of appropriate steps) to curate task plans. These state-abstractions generated from concept representations (or the concepts) of the objects encode object-centric attributes such as shape (e.g., cube, square, cylinder, etc.), size (e.g., small, medium, large, etc.), texture (e.g., rough, smooth, etc.), graspable (e.g., yes or no), etc. along with relational attributes occluded (e.g., number of objects in the way) such as, but are not limited to on-top-of, and in-front-of that can be interpreted from the scene graph. The state abstractions are a combination of object-centric and relational attributes, in one example embodiment of the present disclosure. All the objects kept on the shelf are localized (e.g., by the robot) row-by-row using an object detection algorithm, for example, but is not limited to Yolo-v6. Further each localized object is cropped and sent as input to the concept learner for learning the concepts.

At step 210 of the method of the present disclosure, the one or more hardware processors 104 detect one or more attributes from each of the one or more objects and each of the one or more groups comprised in the one or more representative image frames. The concept learner generates concept embedding that represent various attributes of the objects. The above steps 202 till 210 are better understood by way of following description:

System 100 defines the problem as detection of out-of-context products, where context is based on concepts or attributes, e.g., color or shape-based. The system 100 learns object-based concepts such as location, color, size, shape, spatial relation (behind, front, left, right), texture etc. These concepts will be represented by embedding in a latent space and may be obtained from concept specific neural operators, e.g., concept embedding for shape=ShapeOf(object representation), where ShapeOf(.) is a neural operator corresponding to the shape concept. Based on the similarity measure between the object's concept embedding and embedding for each shape such as round, square, etc. the value of shape of the given object is identified. The knowledge obtained from the perception stage, i.e., the values identified corresponding to each concept may be represented in the form of a scene graph. For example, based on the Relation concept: predicates are object1 isBehind object2; object1 hasClass Mango; object1 hasShape Round. The system 100 further implements a (hybrid) reasoning engine (not shown in FIGS.) that is comprised in the memory 102 to process the obtained knowledge at different levels of abstraction and use the result for task planning, e.g., 'Count all the mangoes on the ground'. As a result, the output at this stage will either be attributes with a localized bounding box, a concept, or a scene graph. These aspects are stored as predicates representing different states and are used for anomaly detection.

Figure 4:
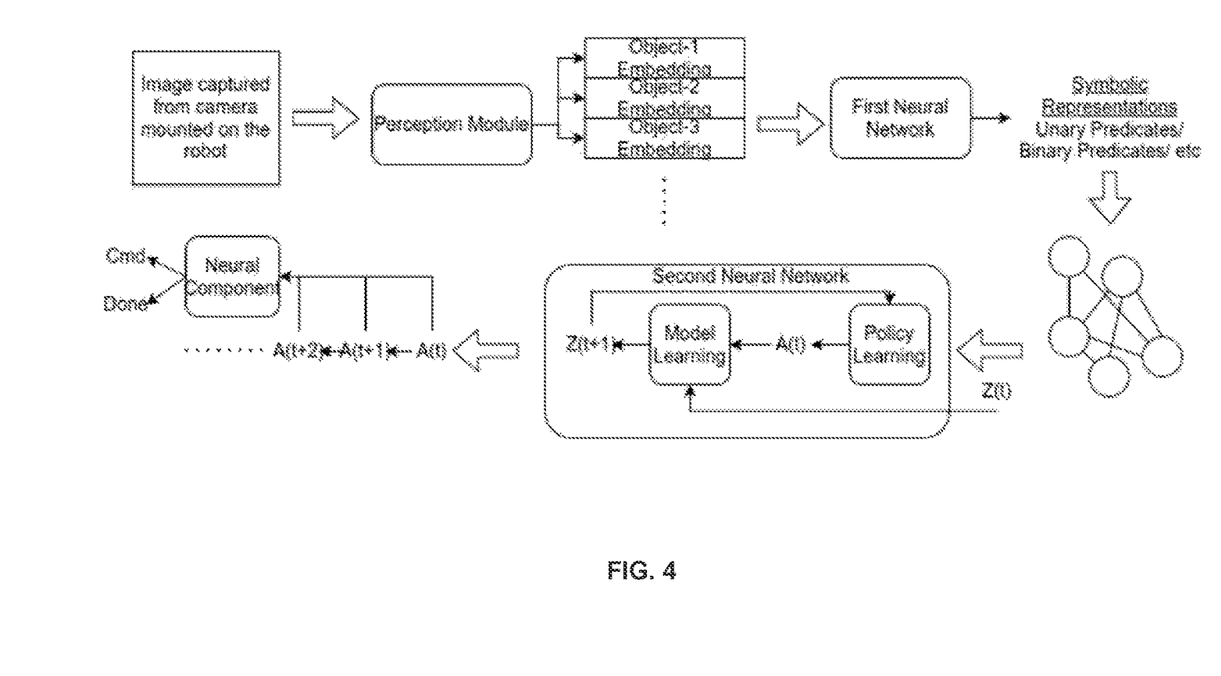
FIG. 4 depicts a block diagram illustrating generation of a task and motion plan corresponding to a goal task being identified, in accordance with an embodiment of the present disclosure.

As mentioned above, at step 212 of the method of the present disclosure, the one or more hardware processors 104 generate a hierarchical scene graph from the one or more concepts and the one or more attributes. The hierarchical scene graph comprises one or more interpretable sub-symbolic representations. The concept embedding are used to construct a heterogeneous scene graph (also referred as hierarchical scene graph and interchangeably used herein)

where each node in the graph is an object in an/the image and two nodes share an edge if they share any spatial relation with each other. At step 214 of the method of the present disclosure, the one or more hardware processors 104 detect one or more anomalies from the generated hierarchical scene graph and the one or more concepts. The anomalies are identified/detected using the concept representations (also referred as the concepts learnt using concept learner stored in the memory 102) based on pairwise similarity measure or clustering algorithms (e.g., similarity measuring technique(s) or clustering technique(s) as known in the art) as well as the information about the relational edges encoded in heterogeneous scene graph. It is to be noted that conventional TAMP assumes deterministic information of the state in a direct symbolic form using a knowledge base or hand-written initial and goal states. The above steps 212 and 214 are better understood along with steps 202 through 210 by way of following description:

Followed by key-frame identification, the group of repetitive elements are discovered in the key frame. The bounding-box of the discovered groups and individual objects are fed to the neuro-symbolic concept learner. The neuro-symbolic concept learner learns concepts and/or attributes such as color, shape, size, spatial relation etc. that are associated with each object present in the detected key frame. Fine-grained attributes such as flavor, brand, etc., are also detected by the system 100. Both group-level and object-level concepts and attributes are fed to the system 100 which invoke a scene graph generator module (not shown in FIGS.) comprised in the memory 102 to create the hierarchical representation of the input scene in the form of a tree graph where each of the shelves, product group and product form a node in the tree graph. Each node is associated with a region in the input scene via a bounding box and the edges represent the spatial relationships. The graph is processed at different levels to detect the anomalies. After detection, the anomaly region is classified so that the corrective action plan can be taken accordingly. In other words, at step 216 of the method of the present disclosure, the one or more hardware processors 104 identify a goal task comprising a sequence of actions based on (i) one or more constraints, and (ii) one or more interpretable symbolic representations obtained from the one or more interpretable sub-symbolic representations comprised in the hierarchical scene graph, wherein the one or more interpretable sub-symbolic representations of a current state of the environment are generated using a first neural network, and wherein the one or more interpretable sub-symbolic representations are mapped to one or more associated symbolic predicates using a second neural network. The goal task comprises a sequence of actions containing a list of objects to be manipulated with an initial state and a goal state. The list of objects to be manipulated for correcting the one or more anomalies is based on the one or more generated scene graph or the one or more concepts. Based on the goal specification that encompasses different objects to be manipulated along with their initial and final goal specification fetched from the concept embedding or the predefined knowledgebase. The anomalous object's target location is obtained by querying the existing knowledge base that comprises of a map of the retail store/environment and the planogram. The one or more interpretable sub-symbolic representations of a current state of the environment are generated using a first neural network wherein the one or more interpretable sub-symbolic representations are mapped to one or more associated symbolic predicates using a second neural network. FIG. 4, with reference to FIGS. 1 through 3, depicts a block diagram illustrating generation of a task and motion plan corresponding to a goal task being identified, in accordance with an embodiment of the present disclosure. The one or more identified anomalies are mapped to a goal task. On the comprehension of the goal task, the information from the concept representations of every object and the relational edges of the heterogeneous graph are used by a Task and Motion Planning module (stored in the memory 102 and invoke for execution of appropriate steps such as generation of a sequence of actions that can correct the anomalous situation.

The sub-symbolic to symbolic representation can be performed by way of a parser (not shown in FIGS.—comprised in the memory 102) that is trained with Reinforcement Learning (e.g., in one instance it may be trained with supervised learning and further refined using self-supervised learning). States and actions can be defined in the symbolic planner which enables system 100 to know what information is to be retrieved from the Perception Module. This can be done in the following manner: wherein output of the Perception Module (latent embedding, i.e., sub-symbolic representations) is taken and mapped to a particular defined state or action in the symbolic planner. For example: one needs to discover if the shape of the object is circular or not. Latent embedding of the image/video stream that comprises of the object→NN→Yes/No.

Referring to steps of FIG. 3, at step 218 of the method of the present disclosure, the one or more hardware processors 104 generate a sequence of robotic actions (or a set of robotic actions) associated with the identified goal task using the first neural network and a pre-defined symbolic knowledge base, wherein the pre-defined symbolic knowledge base is periodically updated using the second neural network. At step 220 of the method of the present disclosure, the one or more hardware processors 104 correct the one or more detected anomalies based on a robot performing the generated set of robotic actions. The generated set of robotic actions comprises one or more commands for execution by a robot wherein the commands may include but are not limited to moving a misaligned object or inappropriate object (e.g., a shampoo bottle of brand A being placed in a row of shampoo bottle of brand B) to a desired location (e.g., correct location). A status of the one or more commands is determined by a binary checking mechanism. For instance, whether the command is executed and completed in an intended or not indicates the status such as, but are not limited to partially executed command, fully completed command as programmed and intended, command is not completed or not initiated, etc.). These commands are executed in an iterative manner based on the status. For instance, if the command is not fully executed and completed as intended, it may be re-executed by the robot until the desired result is achieved (e.g., an object being picked needs to be picked first and the gripper fails to grab the object initially, and the like). Alternatively, the action plan for a given goal task is validated by observing a binary output generated by a Neural Component (e.g., a Crowd Navigation Algorithm/Grasping Algorithm as known in the art wherein such algorithms are stored in the memory 102 and invoked for execution of appropriate steps by the system and method described herein) which notifies the task planner that a particular action in the plan can be executed by the robot or not. If the binary check is 'True' then the output executable command is used to move the robot's mobile base or the gripper of the robot as applicable. The above explanation is better understood by way of following description: The sub-symbolic representations are used by the system 100 to predict the action that robot needs to take that is sampled from a Neural Network policy in conjunction to predicting the next state's sub-symbolic representation using Learned Model until the sequence of actions can achieve the goal state. The sampled action and the sub-symbolic representation are used to generate a command that the robot can execute to interact with its environment and also learn a binary variable done. If done is False after M tries, the control is sent back to the Neural Network Policy and Learned Model to sample another sequence of robotic actions. This process is repeated N times. Both M and N are user-defined hyper-parameters. The above steps 214 through 218 are further better understood by way of following description:

The one or more constraints are obtained based on the one or more interpretable sub-symbolic representations. More specifically, constraints as depicted in FIG. 2 are either predefined from an existing knowledge base and domain expert or it is learnt with the aid of scene graph generation that updates the relations between different entities (e.g., objects) in the environment and various attributes of the objects that have been perceived by the Perception Module of FIG. 2. Features extracted by the Perception Module are converted to symbols that are interpretable by a planner (comprised in the memory 102) to realize the goals and generate a sequence of actions to enable an executable system (e.g., robot) to execute the goal task.

The system 100 translates or converts outputs of the perception module into interpretable and meaningful representations for goal discovery or identification of the goal task. The system 100 compiles symbolic representation containing a list of objects that are to be manipulated, along with their initial and goal states. The list of objects to be manipulated for correcting the one or more anomalies is based on the one or more concepts. For instance, in the domain definition for a Planning Domain Definition Language (PDDL) problem, in the current state-of-the-art, the initial and goal states are predefined by the user. The system 100 converts the perception information into symbols such as "object: item A, goal: location B" to be used for planning. Further, once the task is executed or during the task execution, a Reinforcement Learning agent improvises the goal discovery process by using a reward function that tries to optimize the results of the entire system in terms of correctness and efficiency of anomaly correction. Sequence of robotic actions are generated by taking set of subgoals as input and generating domain and problem files for the Execution Module. The system 100 then generates a graph of robotic actions in the robot's domain (both discrete and continuous) that can be executed in a closed-loop manner. More specifically, the system 100 uses the knowledge base to compose the robot's action primitives into a plan that achieves the discovered goal of anomaly correction. Further, when the actions are being performed by the robot in a given environment, the system 100 enables for navigation with intelligent agents such as humans along with dynamic and static obstacles. The system 100 ensures that the robot not only has to avoid collisions but also ensure that it does not disturb and cause discomfort to any ongoing interaction between a human and other entities (human-human, human-group, human-object {shelf, retail product}) by exploiting human's motion, scene context and their visual attention.

The system 100 in such scenarios can either be an integral part of the robot and/or connected to various components of the robot via one or more communication interfaces as known in the art. Such connectivity and interfacing shall not be construed as limiting the scope of the present disclosure. The knowledge base that the system 100 relies on may consists of a set of predefined motion primitives for the robot, such as pick, place, and move; continuous actions that the robot is expected to perform in a typical environment (e.g., say retail store). For instance, the 'pick' action includes preconditions such as proximity of the gripper to the target object, optimal placement of the gripper wrist and fingers around the object, closing the fingers in a closed loop manner with visual serving to ensure a successful grasp, and finally lifting the object out of its initial position and into a neutral position that would allow for its movement. The execution of all these smaller actions is abstracted away from the TAMP layer, with only the post-condition of successful completion of the pick acting as the trigger for proceeding to the next task in the plan. Task execution is enabled by way of grasping capabilities that the robot possesses. The Robot may be equipped with a physical grasper, the associated control system and a grasp planner. Grasp planner gives the plan for executing successful grasp of an object which is detected as an anomaly by the previous stage and the grasp controller gives the required control signals to the physical grasper and the robot for executing the plan. In one instance, the system 100 implements a Grasp Quality (GQ) CNN, a convolutional neural network (CNN)-based method for vision-based grasp planning of parallel jaw grippers, as the first stage in the grasp planner. The output from the GQCNN is given as a state variable to the RL agent that generates the required control signal for the gripper and manipulator. The RL agent mentioned here can be tailor-made to control different type of grippers—multi-fingered, compliant, or soft.

The system 100 considers anomaly as out-of-context product. The example of anomalies in the present disclosure can be, but are not limited to: misplaced object, misaligned object, out-of-stock object, etc. The approach used by the system 100 is explained by taking example of misplaced object (incorrectly placed object) anomaly type. The above paragraphs and steps of the method of the present disclosure may be better understood by way of following description: Consider a robot that scans the shelves using a stereo camera. The perception module (or the system 100) as depicted in FIGS. 1-2 processes the key frame in order to detect whether there exists an anomaly. The perception module or the system 100 identifies the anomaly based on color attribute and provide location of anomalous object as LOCATIONX of SHELFA via sensory input. Along-with the present position, the target position, that is LOCATIONY of SHELFB, is also obtained via predefined knowledge for the detected anomalous object. If the target location for anomalous object is not present in the knowledge base, then the target position is assigned as LOCATIONZ of BUFFER-ZONE and the knowledge base is also updated. By parsing this information into a symbolic goal, the high-level planner or the system 100 generates a sequence of actions with respect to the robot's motion primitives that leads to anomaly correction. Following is the illustrative task plan:

1. GRASP PRODUCT1 LOCATIONX SHELFA   // Grasp the product on location x of shelf A
2. PICK PRODUCT1 LOCATIONX SHELFA   // Pick the product from location x of shelf A

| | -continued | |
|---|---|---|
| 3. | MOVE SHELFA SHELFB shelf B | // Move from shelf A to |
| 4. | DETECT LOCATIONY SHELFB | // Detect location y |
| 5. | SENSE LOCATIONY SHELFB re-plan if needed (e.g., no space on the shelf) | // Sense location y and |
| 6. | PLACE PRODUCT1 LOCATIONY SHELFB location y of shelf B | //Place the product on |

Finally, the plan would be executed by moving the mobile base, grasping the object, moving to the correct shelf, and placing the object there, with feedback control at every step. During the manipulation of the objects if the environment is altered (or already the environment is altered prior to object manipulation), then knowledge of the altered environment is obtained based on the one or more interpretable sub-symbolic representations. To manipulate any object, a grasping module (stored in the memory 102 and invoked for execution of appropriate steps) makes use of the object embeddings and the relational information encoded in the heterogeneous scene graph. In a nutshell, as depicted in FIG. 4, the system 100 (or the robot) invokes the perception module of FIG. 2 for localizing the objects in the scene and generate concept embedding (or concepts) across each localized object. The object embedding are further used to construct the heterogeneous scene graph where each node in the graph represents the object in the scene. Each edge in the graph encodes a spatial relationship between two objects. Node features are represented using the object embedding generated by the concept learner. An edge vector may correspond to an encoding to uniquely identify the relationship type and the two node types. The system 100 trains a Graph Neural Network (e.g., a first neural network) to generate a state embedding that represents a latent/low-dimensional representation of the current state of the environment. In other words, the one or more interpretable sub-symbolic representations of a current state of the environment are generated using the first neural network. The system 100 then uses state embedding to predict the action that robot needs to take that is sampled from another neural network (e.g., a second neural network). In the present disclosure, the system 100 may implement any of the conventionally known neural network architectures serving as the first neural network and the second neural network, and such architectures and examples of the neural networks shall not be construed as limiting the scope of the present disclosure. The state embedding and the action is then further passed through a Neural Component (as depicted in FIG. 4) that generates a command for the robot to execute and a Boolean output (done/complete status) is learnt to identify if the command can be executed by the robot in the current state or not. If the action cannot be executed by the robot (done=False), the Neural Component is queried again, M times, until a valid command can be generated. If after M trials, a command cannot be sampled, the task planner is prompted again to generate a new action. This back and forth between the Neural Component (Motion Planner) and Task Planner is continued until N times (or until the action is completed and achieved as intended). Then the next state embedding is predicted using the current state embedding and action such that it maximizes the reward, which is then used to generate the next action. The task planner is prompted until the goal state is achieved.

Embodiments of the present disclosure provide systems and methods that automate the management of inventory and/or objects or group of objects in an environment (e.g., warehouse, a retail store) by firstly detecting anomalies and then correcting the detected anomalies in terms of perception and mobile manipulation. System and method of the present disclosure alleviate the downward refinability assumption, that is, planning can be decomposed separate symbolic and continuous planning steps. Usual task planners assume that the task-plans it provides are executable by the motion planner, hence these are not task-aware. The system and method of the present disclosure address this by introducing bilevel planning, wherein a task planner is implemented to curate a plan which is a series of actions on which a feasibility check is done by a Neural component that is verified if the task plan is achievable at an execution level or not. Once all actions in the task plan are achievable, the plan is finalized to get accomplish the goal task by the robot.

In the present disclosure, the system and method do not assume that parameters required to carry out a particular action given by the Task Planner are pre-defined in the knowledge base but instead the system and method implement the perception module to learn them. To tackle this, for each action and its corresponding parameters, the system learns a mapping also known as a function approximator, which in the present disclosure is a Neural Network that converts these abstract symbolic actions to continuous vectors that is used by the Motion Planning and Execution module to make the agent interact with its environment. More specifically, the Neural Network takes in the continuous latent representations that are learnt by the Perception Module, which are referred as sub-symbolic representations, to state-abstractions that uniquely identify the symbols used by the task and motion planner/planning module (TAMP) for curating a plan.

Below is an example that demonstrates how the method of the present disclosure works end-to-end (e.g., training and inference). A goal is generated that indicates the robot needs to detect misplaced anomalies and correct them. To achieve this goal, the robot first comes up with a task plan, that is, a sequence of actions that the robot needs to take in order to detect the anomaly and correct it by placing it in the right region (where it belongs so that it is not an anomaly anymore). Typical failures of a convention TAMP can be: 1) All objects in the scene are not correctly detected/identified, 2) The symbolically defined goal state does not have the correct grounding in the physical space due to changes in the environment (e.g., the target table/bin is moved, occluded, or is full of other objects), and the like. These failures can be reduced by including sub-symbolic information/representations. If the planner was purely symbolic, it would not know how to recover from a case where no feasible plan was generated. For instance, in the first case, if no anomaly was detected, but the sub-symbolic concept embeddings/representations showed that one of the objects is slightly different than the others (though below the threshold for an anomaly), the planner (or TAMP) could perform an action of collecting additional images from different camera angles near that object to try and find anomalies. This is not the case in regular or conventional TAMP formulations. In the second case, if the goal location/condition is changed in the physical world, dynamic re-planning can be done with those sub-symbolic information/representations, instead of a binary fail/success signal (e.g., if the target object to grasp is suddenly occluded by another entity, the Task Planner can make use of the sub-symbolic information to re-plan to accommodate this uncertainty).

The first thing to do is to call the Task Planner (also referred as TAMP of the system and method of the present disclosure) to give a task plan which in this case would be similar to the following: Go to an unvisited shelf→Localize all the objects in the shelf row by row→Identify the anomalous object→Get closer to the anomalous object→Extend the robot arm to pick the anomalous object→Fetch the right location of the anomalous object using knowledge base (planogram)→Traverse to the fetched location→Detect for free space in the region→Place the then anomalous object.

Translation of above task plan to Action Sequence may be as follows: Traverse(robot_loc, unvisited_shelf_loc, params)→Localize(base_camera, params)→Co-AD (cropped_img_objects, params)→Traverse(robot_loc, target_loc, params)→Grasp Pick(robot_arm, arm_camera, target_loc, object_type, scene_graph)→Anomaly_Loc (object_type, knowledge_base)→Traverse(robot_loc, target_loc, params)→FreeSpace(base_camera, object_type)→GraspPlace(robot_arm, arm_camera, scene_graph, target_loc, object_type).

For every action in the task plan, a feasibility check is performed by the task planner (or TAMP of the system 100 of FIG. 2) and hence the plan it comes up with is task-aware, that is, the final plan that the task planner gives out is achievable by the robot under some uncertainty (e.g., while traversing dynamic obstacles can come in the way of the robot; target objects to fetch can be occluded due to the presence of other object(s)) that is accounted for while planning.

The system and method involve some preliminary steps that need to be carried out to find and identify anomalous objects, construct a scene graph and acquire state-abstractions of the different object types present in the scene. However, planning becomes more dynamic in nature that requires some reasoning and feedback to replan on the fly. For example, why can the robot's arm grasp a particular object? What to do if there is no free space available to correct the anomaly? Why can the robot not place the object appropriately? How many objects to move to make the target anomalous object accessible? A fixed-template plan usually fails to work. The plan that is constructed from here on factors in feasibility check and alleviates the downward refinability assumption, that is, planning can be decomposed into separate symbolic and continuous planning steps.

The system and method use search and then sample technique to carry out bi-level planning. In the first step, a plan is curated to achieve the goal specification which is obtained by mapping the anomaly type to either of the following anomalies (a) misplaced anomaly (b) misaligned anomaly (c) out-of-stock anomaly (d) rearrangement anomaly.

After the plan is curated, in the second step the system 100 uses neural operators that are unique to each action in the plan curated by the task planner. The Neural operators take in the state-abstractions of all the objects relevant to the current environment state and action to sample continuous action primitives that enables the robot to interact with its environment. While training, the sampling of continuous action primitives is repeated "M" times (user-defined hyper-parameter) if the neural operator is unable to sample a feasible action the previous "M−1" times. After "M" tries, the first step of the planning process is called once again, to curate a new task plan. This entire process of "search-and-sample is repeated "N" times (user-defined hyper-parameter) till a feasible plan that can be executed is generated by the Task and Motion Planning module.

The state-abstractions pertaining to every object type are learned in two stages with a Convolutional Neural Network: In the first stage, neural network is trained using Supervised Learning approach with the offline database of various products (e.g., retail products). Essentially, the neural network's objective is to map each object to the variety of object-centric attributes. In the second stage, these object-centric attributes are fine-tuned with the feedback obtained when the robot interacts with its environment.

However, the question remains how could a conventional TAMP fail in the above example? As mentioned above, conventional TAMP assumes deterministic information of the state in a direct symbolic form using a knowledge base or hand-written initial and goal states. The system and method attempt to resolve this technical problem and move away from this determinism because in the retail store, one can come across a very large variety of objects that cannot be accounted for before-hand. Hence, concept level state-attributes are learnt such as shape, colour, texture, etc. for different objects since they remain constant irrespective of the number different retail products. These concepts help uniquely identify each object category.

The symbolically defined goal state does not have the correct grounding in the physical space due to changes in the environment (e.g., the target table/bin is moved, occluded, or is full of other objects). These failures can be accounted for by making use of sub-symbolic information provided by the Perception Module. If the planner was purely symbolic, it would not know how to recover from a case where no feasible plan was generated. For example, in the first case, if no anomaly was detected, but the sub-symbolic concept embedding showed that one of the objects is slightly different than the others (though below the threshold for an anomaly), the planner (or TAMP of the system and method of the present disclosure) could perform an action of collecting additional images from different camera angles near that object to try and find anomalies. This is not the case in conventional TAMP formulations. In the second case, if the goal location/condition is changed in the physical world, dynamic re-planning can be done with that sub-symbolic information, instead of a binary fail/success signal and relying only on the predefined knowledge base. For example, instead of having rigid goal conditions like place object on location (x, y, z), the goal specification can be relaxed to place object on table and the robot can actively perceive the table and figure out the position where the object is to be placed.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g., any kind of computer like a server or a personal computer, or the like, or any combination thereof. The device may also include means which could be e.g., hardware means like e.g., an application-specific integrated circuit (ASIC), a field-programmable gate array (FPGA), or a combination of hardware and software means, e.g., an ASIC and an FPGA, or at least one microprocessor and at least one memory with software processing components located therein. Thus, the means can include both hardware means and software means. The method embodiments described herein could be implemented in hardware and software. The device may also include software means. Alternatively, the embodiments may be implemented on different hardware devices, e.g., using a plurality of CPUs.

The embodiments herein can comprise hardware and software elements. The embodiments that are implemented in software include but are not limited to, firmware, resident software, microcode, etc. The functions performed by various components described herein may be implemented in other components or combinations of other components. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. A processor implemented method comprising:
   obtaining, via one or more hardware processors, an input stereo video captured by a video capturing device, wherein the input stereo video is associated with an environment;
   identifying, via the one or more hardware processors, one or more red, green and blue (RGB) stereo image frames from the input stereo video;
   detecting, via the one or more hardware processors, one or more representative image frames from the one or more RGB stereo image frames and identifying one or more bounding boxes associated with at least one of one or more groups and one or more objects comprised in the one or more groups present in the one or more representative image frames;
   learning, via the one or more hardware processors, one or more concepts associated with each of the one or more objects and each of the one or more groups comprised in the one or more representative image frames using a concept learner;
   detecting, via the one or more hardware processors, one or more attributes from each of the one or more objects and each of the one or more groups comprised in the one or more representative image frames;
   generating, via the one or more hardware processors, a hierarchical scene graph from the one or more concepts and the one or more attributes, wherein the generated hierarchical scene graph comprises one or more interpretable sub-symbolic representations;
   detecting, via the one or more hardware processors, one or more anomalies using at least one of the generated hierarchical scene graph and the one or more concepts;
   identifying, via the one or more hardware processors, a goal task further comprising a sequence of actions based on (i) one or more constraints, and (ii) one or more interpretable symbolic representations obtained from the one or more interpretable sub-symbolic representations comprised in the generated hierarchical scene graph, wherein the one or more interpretable sub-symbolic representations of a current state of the environment are generated using a first neural network, and wherein the one or more interpretable sub-symbolic representations are mapped to one or more associated symbolic predicates using a second neural network;
   generating, via the one or more hardware processors, a set of robotic actions associated with the identified goal task using the first neural network and a pre-defined symbolic knowledge base, wherein the pre-defined symbolic knowledge base is periodically updated using the second neural network; and
   correcting, via the one or more hardware processors, the one or more detected anomalies based on a robot performing the generated set of robotic actions.

2. The processor implemented method of claim 1, wherein the one or more concepts comprise at least one of color, shape, size, and spatial relation associated with the one or more objects.

3. The processor implemented method of claim 1, wherein the goal task comprises a sequence of actions containing a list of objects to be manipulated with an initial state and a goal state, and wherein the list of objects to be manipulated for correcting the one or more anomalies is based on the generated hierarchical scene graph or the one or more concepts.

4. The processor implemented method of claim 1, wherein a knowledge of altered environment is obtained based on the one or more interpretable sub-symbolic representations.

5. The processor implemented method of claim 1, wherein the generated set of robotic actions comprises one or more commands for execution by a robot, and wherein a status of the one or more commands is determined by a binary checking mechanism, and wherein the one or more commands are executed in an iterative manner based on the status.

6. A system comprising:
a memory storing instructions;
one or more communication interfaces; and
one or more hardware processors coupled to the memory via the one or more communication interfaces, wherein the one or more hardware processors are configured by the instructions to:
obtain, an input stereo video captured by a video capturing device, wherein the input stereo video is associated with an environment;
identify one or more red, green and blue (RGB) stereo image frames from the input stereo video;
detect one or more representative image frames from the one or more RGB stereo image frames and identifying one or more bounding boxes associated with at least one of one or more groups and one or more objects comprised in the one or more groups present in the one or more representative image frames;
learn one or more concepts associated with each of the one or more objects and each of the one or more groups comprised in the one or more representative image frames using a concept learner;
detect one or more attributes from each of the one or more objects and each of the one or more groups comprised in the one or more representative image frames;
generate a hierarchical scene graph from the one or more concepts and the one or more attributes, wherein the generated hierarchical scene graph comprises one or more interpretable sub-symbolic representations;
detect one or more anomalies using at least one of the generated hierarchical scene graph and the one or more concepts;
identify a goal task further comprising a sequence of actions based on (i) one or more constraints, and (ii) one or more interpretable symbolic representations obtained from the one or more interpretable sub-symbolic representations comprised in the generated hierarchical scene graph, wherein the one or more interpretable sub-symbolic representations of a current state of the environment are generated using a first neural network, and wherein the one or more interpretable sub-symbolic representations are mapped to one or more associated symbolic predicates using a second neural network;
generate a set of robotic actions associated with the identified goal task using the first neural network and a pre-defined symbolic knowledge base, wherein the pre-defined symbolic knowledge base is periodically updated using the second neural network; and
correct the one or more detected anomalies based on a robot performing the generated set of robotic actions.

7. The system of claim 6, wherein the one or more concepts comprise at least one of color, shape, size, and spatial relation associated with the one or more objects.

8. The system of claim 6, wherein the goal task comprises a sequence of actions containing a list of objects to be manipulated with an initial state and a goal state, and wherein the list of objects to be manipulated for correcting the one or more anomalies is based on the generated hierarchical scene graph or the one or more concepts.

9. The system of claim 6, wherein a knowledge of altered environment is obtained based on the one or more interpretable sub-symbolic representations.

10. The system of claim 6, wherein the generated set of robotic actions comprises one or more commands for execution by a robot, and wherein a status of the one or more commands is determined by a binary checking mechanism, and wherein the one or more commands are executed in an iterative manner based on the status.

11. One or more non-transitory machine-readable information storage mediums comprising one or more instructions which when executed by one or more hardware processors cause:
obtaining an input stereo video captured by a video capturing device, wherein the input stereo video is associated with an environment;
identifying one or more red, green and blue (RGB) stereo image frames from the input stereo video;
detecting one or more representative image frames from the one or more RGB stereo image frames and identifying one or more bounding boxes associated with at least one of one or more groups and one or more objects comprised in the one or more groups present in the one or more representative image frames;
learning one or more concepts associated with each of the one or more objects and each of the one or more groups comprised in the one or more representative image frames using a concept learner;
detecting one or more attributes from each of the one or more objects and each of the one or more groups comprised in the one or more representative image frames;
generating a hierarchical scene graph from the one or more concepts and the one or more attributes, wherein the generated hierarchical scene graph comprises one or more interpretable sub-symbolic representations;
detecting one or more anomalies using at least one of the generated hierarchical scene graph and the one or more concepts;
identifying a goal task further comprising a sequence of actions based on (i) one or more constraints, and (ii) one or more interpretable symbolic representations obtained from the one or more interpretable sub-symbolic representations comprised in the generated hierarchical scene graph, wherein the one or more interpretable sub-symbolic representations of a current state of the environment are generated using a first neural network, and wherein the one or more interpretable sub-symbolic representations are mapped to one or more associated symbolic predicates using a second neural network;
generating a set of robotic actions associated with the identified goal task using the first neural network and a pre-defined symbolic knowledge base, wherein the pre-defined symbolic knowledge base is periodically updated using the second neural network; and
correcting the one or more detected anomalies based on a robot performing the generated set of robotic actions.

12. The one or more non-transitory machine-readable information storage mediums of claim 11, wherein the one or more concepts comprise at least one of color, shape, size, and spatial relation associated with the one or more objects.

13. The one or more non-transitory machine-readable information storage mediums of claim 11, wherein the goal task comprises a sequence of actions containing a list of objects to be manipulated with an initial state and a goal state, and wherein the list of objects to be manipulated for correcting the one or more anomalies is based on the generated hierarchical scene graph or the one or more concepts.

14. The one or more non-transitory machine-readable information storage mediums of claim 11, wherein a knowledge of altered environment is obtained based on the one or more interpretable sub-symbolic representations.

15. The one or more non-transitory machine-readable information storage mediums of claim 11, wherein the generated set of robotic actions comprises one or more commands for execution by a robot, and wherein a status of the one or more commands is determined by a binary checking mechanism, and wherein the one or more commands are executed in an iterative manner based on the status.

* * * * *